(12) United States Patent
Trauth

(10) Patent No.: US 9,910,570 B2
(45) Date of Patent: Mar. 6, 2018

(54) SYSTEM AND METHOD OF PRESENTING MEDIA CONTENT

(71) Applicant: Facebook, Inc., Menlo Park, CA (US)

(72) Inventor: Kurt Trauth, San Antonio, TX (US)

(73) Assignee: FACEBOOK, INC., Menlo Park, CA (US)

( * ) Notice: Subject to any disclaimer, the term of this patent is extended or adjusted under 35 U.S.C. 154(b) by 118 days.

(21) Appl. No.: 14/323,872

(22) Filed: Jul. 3, 2014

(65) Prior Publication Data

US 2014/0324976 A1 Oct. 30, 2014

Related U.S. Application Data

(63) Continuation of application No. 14/323,147, filed on Jul. 3, 2014, now abandoned, which is a continuation
(Continued)

(51) Int. Cl.
| | |
|---|---|
| *H04L 29/08* | (2006.01) |
| *G06F 3/0484* | (2013.01) |
| *G06F 3/0482* | (2013.01) |
| *G06F 3/0485* | (2013.01) |
| *G06F 3/0489* | (2013.01) |
| *H04N 21/4786* | (2011.01) |
| *G06F 3/0481* | (2013.01) |
| *G06T 3/40* | (2006.01) |
| *H04L 12/58* | (2006.01) |

(52) U.S. Cl.
CPC ........ *G06F 3/04842* (2013.01); *G06F 3/0482* (2013.01); *G06F 3/0485* (2013.01); *G06F 3/0489* (2013.01); *G06F 3/04817* (2013.01); *G06T 3/4038* (2013.01); *H04L 51/10* (2013.01); *H04L 51/32* (2013.01); *H04L 67/104* (2013.01); *H04L 67/26* (2013.01); *H04L 67/306* (2013.01); *H04N 21/4786* (2013.01)

(58) Field of Classification Search
CPC ....................................................... H04L 29/08
USPC ........................................ 709/204; 715/733
See application file for complete search history.

(56) References Cited

U.S. PATENT DOCUMENTS

| | | |
|---|---|---|
| 6,288,719 B1 | 9/2001 | Squilla et al. |
| 6,362,900 B1 | 3/2002 | Squilla et al. |

(Continued)

OTHER PUBLICATIONS

"How do I add videos to a Stream?", YouTube—Broadcast Yourself, retrieved from <<http://www.google.com/support/youtube/bin/answer.py?answer=57953&topic=10540>>, retrieved on Feb. 28, 2007, YouTube, Inc, 1 Page.

(Continued)

*Primary Examiner* — Tadeese Hailu
*Assistant Examiner* — Darrin Hope
(74) *Attorney, Agent, or Firm* — Keller Jolley Preece

(57) ABSTRACT

A method includes monitoring media content at media content locations to identify media content items. The media content locations are identified in social network data stored by a set-top box device. The method includes receiving, at the set-top box device, a command to present image cells to a display device. The command is responsive to an alert sent from the set-top box device. The method also includes presenting the image cells at the display device. At least one of the image cells includes an image corresponding to an identified media content item.

20 Claims, 14 Drawing Sheets

Related U.S. Application Data of application No. 14/034,704, filed on Sep. 24, 2013, which is a continuation of application No. 13/010,576, filed on Jan. 20, 2011, now Pat. No. 8,572,491, which is a continuation of application No. 11/726,369, filed on Mar. 21, 2007, now Pat. No. 7,917,853.

(56) References Cited

U.S. PATENT DOCUMENTS

| | | |
|---|---|---|
| 6,434,579 B1 | 8/2002 | Shaffer et al. |
| 6,690,843 B1 | 2/2004 | Squilla et al. |
| 6,724,403 B1 | 4/2004 | Santoro et al. |
| 6,957,398 B1 | 10/2005 | Nayeri |
| 6,961,904 B2 | 11/2005 | Pilu |
| 7,219,153 B1 | 5/2007 | Day |
| 7,917,853 B2 | 3/2011 | Trauth |
| 8,572,491 B2 | 10/2013 | Trauth |
| 2003/0020671 A1 | 1/2003 | Santoro et al. |
| 2004/0019584 A1 | 1/2004 | Greening et al. |
| 2004/0044723 A1 | 3/2004 | Bell et al. |
| 2004/0117821 A1* | 6/2004 | Karaoguz ......... H04L 29/06027 725/37 |
| 2004/0117853 A1 | 6/2004 | Karaoguz et al. |
| 2005/0097173 A1 | 5/2005 | Johns et al. |
| 2005/0111737 A1 | 5/2005 | Das et al. |
| 2005/0114459 A1 | 5/2005 | Tu et al. |
| 2005/0122345 A1 | 6/2005 | Kim et al. |
| 2005/0196305 A1 | 9/2005 | Pezaris et al. |
| 2005/0240964 A1 | 10/2005 | Barrett |
| 2005/0280719 A1 | 12/2005 | Kim et al. |
| 2006/0074771 A1 | 4/2006 | Kim et al. |
| 2006/0078201 A1 | 4/2006 | Kim et al. |
| 2006/0095514 A1 | 5/2006 | Wang et al. |
| 2006/0095976 A1 | 5/2006 | Torres et al. |
| 2006/0161863 A1 | 7/2006 | Gallo |
| 2006/0170956 A1 | 8/2006 | Jung et al. |
| 2006/0200842 A1* | 9/2006 | Chapman ............... H04N 7/163 725/34 |
| 2006/0230061 A1 | 10/2006 | Sample et al. |
| 2006/0242139 A1 | 10/2006 | Butterfield et al. |
| 2007/0136750 A1* | 6/2007 | Abanami ........... H04N 5/44543 725/44 |
| 2007/0162845 A1 | 7/2007 | Cave et al. |
| 2007/0162953 A1 | 7/2007 | Bolliger et al. |
| 2007/0174389 A1* | 7/2007 | Armstrong ........ G06F 17/30867 709/204 |
| 2008/0072252 A1* | 3/2008 | Morris ............... H04N 5/44591 725/38 |
| 2008/0092156 A1* | 4/2008 | Ferrone .................. H04H 60/33 725/13 |
| 2014/0026163 A1 | 1/2014 | Trauth |
| 2014/0317509 A1 | 10/2014 | Trauth |
| 2014/0317525 A1 | 10/2014 | Trauth |
| 2016/0077712 A1 | 3/2016 | Trauth |
| 2016/0080513 A1 | 3/2016 | Trauth |

OTHER PUBLICATIONS

"About YouTube", YouTube—Broadcast Yourself, retrieved from <<http://www.youtube.com/t/about>>, retrieved on Feb. 28, 2007, YouTube, Inc, 1 Page.

"Product Overview", retrieved from <<http://www1.meevee.com/corp/Product/ProductOverview/tabld/65/Default.aspx>>, retrieved on Feb. 28, 2007, MeeVeeInc., 1 page.

"News feeds from the BBC", BBC News, retrieved from <<http://news.bbs.co.uk/1/hi/help/3223484.stm>>, retrieved on Mar. 7, 2007, 3 pages.

"How to Get the Most Out of Flickr", retrieved from <<http://www.flickr.com/get_the_most.gne>>, retrieved on Mar. 7, 2007, Yahoo! Inc., 3 pages.

U.S. Appl. No. 11/726,369, dated Nov. 24, 2009, Office Action.
U.S. Appl. No. 11/726,369, dated Jul. 1, 2010, Office Action.
U.S. Appl. No. 11/726,369, dated Oct. 28, 2010, Notice of Allowance.
U.S. Appl. No. 13/010,576, dated Jul. 18, 2012, Office Action.
U.S. Appl. No. 13/010,576, dated Feb. 6, 2013, Office Action.
U.S. Appl. No. 13/010,576, dated Jun. 21, 2013, Notice of Allowance.
U.S. Appl. No. 14/034,704, dated Dec. 15, 2015, Office Action.
U.S. Appl. No. 14/034,704, dated Aug. 25, 2016, Office Action.
U.S. Appl. No. 14/323,147, dated Apr. 22, 2016, Office Action.
U.S. Appl. No. 14/323,536, dated Apr. 12, 2016, Office Action.
U.S. Appl. No. 14/034,704, dated Jul. 12, 2017, Notice of Allowance.
U.S. Appl. No. 14/950,853, dated Dec. 28, 2017, Office Action.

* cited by examiner

SYSTEM AND METHOD OF PRESENTING MEDIA CONTENT

CLAIM OF PRIORITY

The present application is a continuation of U.S. patent application Ser. No. 14/323,147, filed Jul. 3, 2014, which is a continuation of U.S. patent application Ser. No. 14/034, 704, filed Sep. 24, 2013, which is a continuation of U.S. patent application Ser. No. 13/010,576, filed on Jan. 20, 2011 now issued as U.S. Pat. No. 8,572,491, which is a continuation of U.S. patent application Ser. No. 11/726,369, filed on Mar. 21, 2007 now issued as U.S. Pat. No. 7,917, 853. Each of the aforementioned patent(s) and application(s) is hereby incorporated by reference in its entirety.

FIELD OF THE DISCLOSURE

The present disclosure is generally related to systems and methods of presenting media content.

BACKGROUND

Currently, websites are available for users to share media content, such as photos, audio clips, or video clips with other users. Such websites may allow a user to upload pictures to a user designated portion of the website. A user may also send an email announcement to notify other users that the pictures have been uploaded. The process of first uploading a set of pictures and then subsequently sending out an email to a list of recipients can be time consuming and inefficient.

DETAILED DESCRIPTION

In a particular embodiment, a method of presenting media content includes receiving a command to present multiple image cells to a first device of a first user after an alert is sent to a second device associated with the first user. The method also includes sending a first view including multiple image cells to the first device of the first user, where at least one cell of the multiple image cells includes an image. The method further includes automatically collecting a second image from a third party website and sending a second view to the first device. The second view includes the multiple image cells and includes the second image.

In another particular embodiment, a method of presenting media content includes sending a first graphical user interface (GUI) from a server to a first device of a first user. The first GUI receives one or more identifiers of one or more other users of a social network. The method also includes automatically collecting data related to available media content from a selected third party website and sending an alert from the server to a second device associated with the first user when updated media content is available. The method further includes generating, at the server, a second GUI including multiple image cells, where at least one of the multiple image cells includes an image related to the updated media content.

In still another particular embodiment, a non-transitory processor-readable medium includes instructions executable by a processor to generate a graphical user interface (GUI) to present media content to a display device associated with a first user. The GUI includes multiple selectable cells arranged in at least two rows, where a first row includes images related to media content of the first user, and where each additional row includes images related to media content from a source other than the first user.

Figure 1:
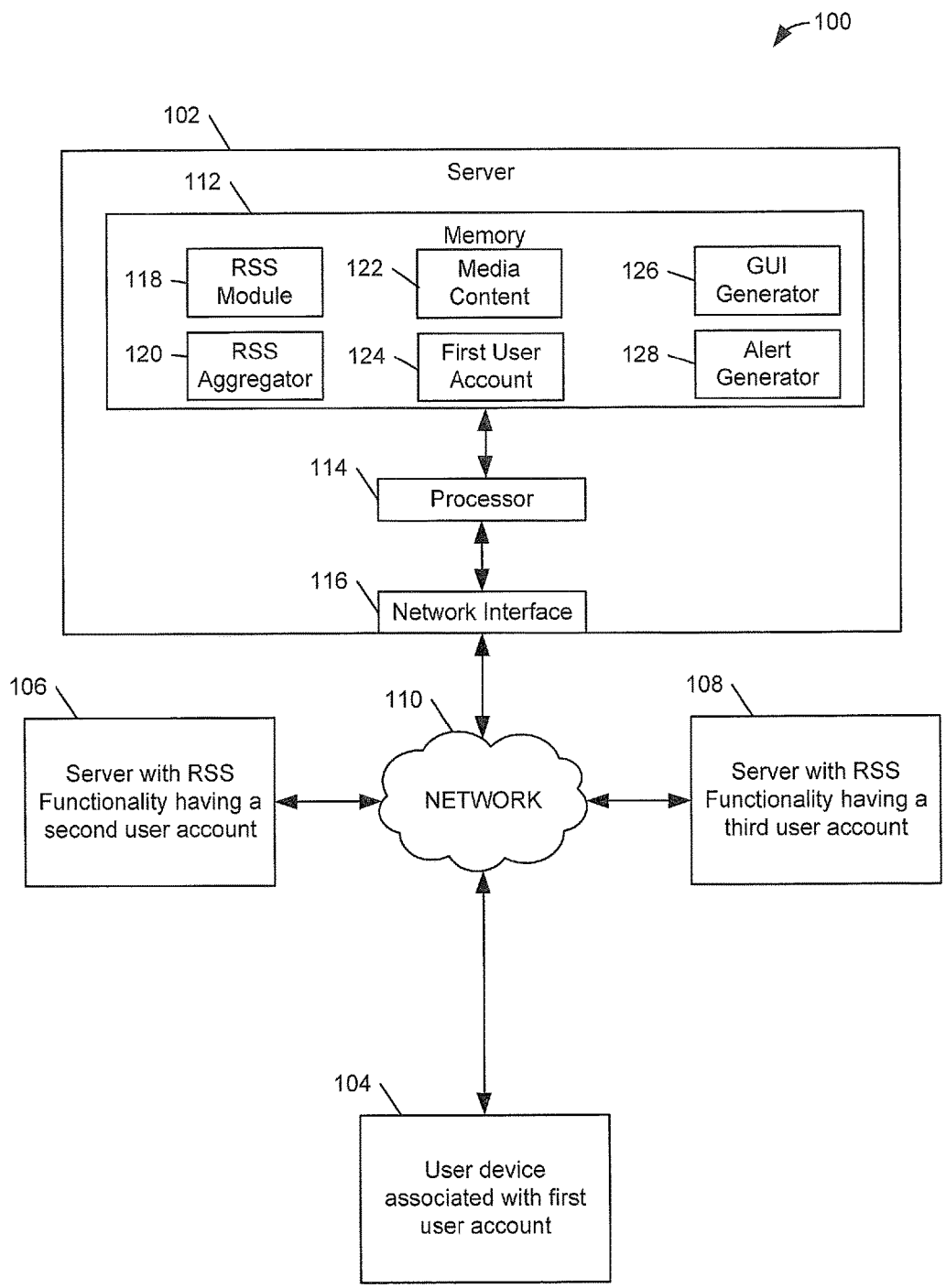
FIG. 1 is a block diagram of a particular illustrative embodiment of a system to present media content.

FIG. 1 is a block diagram of a particular illustrative embodiment of a system 100 to present media content. The system 100 includes a user device 104 that can communicate with a server 102 via a network 110. The user device 104 may serve as a destination device and may be implemented as any device or system that includes computer functionality, such as a set top box, a personal computer with browser, a personal digital assistant (PDA), a web-enabled mobile device, such as a smart phone, or any other similar device having access to the server 102. The server 102 may communicate with other servers, such as a server 106 and a server 108 via the network 110. The server 102 includes logic (such as a processor 114) and a memory 112 that is accessible to the processor 114. The server 102 also includes a network interface 116 that is responsive to the network 110 to send and receive data. In a particular illustrative embodiment, the network 110 may be a public network, such as the Internet.

The memory 112 includes a Really Simple Syndication (RSS) module 118, an RSS aggregator module 120, media content storage 122, first user account information 124, and a graphical user interface (GUI) generator module 126. The RSS module 118 can be executed by the processor 114 to receive requests from users to subscribe to media content (i.e. subscribers) and to share new media content with such subscribers. The RSS aggregator module 120 can be executed by the processor 114 to aggregate new media content from the server 102 or new media content received via RSS feeds from other servers, such as the servers 106 and 108. The server 102 may store the aggregated media content in a media content storage 122. The GUI generator module 126 is executable by the processor to generate a graphical user interface including multiple image cells, including the new media content and media content related to the first user account 124. In a particular illustrative embodiment, the multiple image cells may be arranged as a matrix or table having multiple image cells.

In a particular illustrative embodiment, a first user may utilize the user device 104 to access the server 102 and to upload media content, such as digital pictures, audio data, video data, or any combination thereof. The server 102 may store the uploaded media content at the media content storage 122. The server 102 may associate the uploaded (new) media content with the first user account 124 and may utilize the RSS module 118 to generate an RSS document (which may include extensible markup language (XML), hypertext markup language (HTML), images, audio data, video data, text, or any combination thereof) that is related to the new media content. The server 102 may provide the RSS document at a particular location, such as a publicly available website location. RSS aggregators, such as the RSS aggregator 120, can use the RSS document to access information about the new media content. By generating the RSS document, the server 102 "syndicates" the media content for access by various subscribers.

In a particular illustrative embodiment, the first user may utilize the user device 104 to access the server 102 via the network 110. The first user may configure the first user account 124 to include subscriptions to information hosted by one or more other servers, such as the servers 106 and 108. For example, the first user may subscribe to media content associated with a second user account that is hosted by the server 106 and to media content associated with a third user account that is hosted by the server 108. The server 102 may utilize the RSS aggregator module 120 to monitor RSS feeds produced by the servers 106 and 108. When the RSS aggregator module 120 identifies new media content, the RSS aggregator module 120 may be utilized to retrieve data (such as an image) related to the new media content and to aggregate the retrieved data with existing data in the media content storage 122.

The server 102 may utilize the GUI generator 126 to generate a graphical user interface including a multiple image cells, where each cell includes data related to particular media content. The GUI generator 126 may replace an oldest item within the multiple image cells with the retrieved data, and the server 102 may move the oldest item to an archive (not shown).

In a particular illustrative embodiment, the server 102 may utilize the processor 114 to execute an alert generator 128 to generate and transmit an alert to the user device 104 that is associated with the first user account 124 when there is updated media content. In a particular illustrative embodiment, the updated media content may include digital images, audio data, video data, text data, or any combination thereof, that may be uploaded by the second user or another user associated with a social network of the first user. For example, the first user may want to view media content that is uploaded to a web server by any person in his social network, such as friends and family. Since members of the social network may not update their website frequently, the first user may wish to be notified when new media content is available, so that the first user can view the new media content. In a particular illustrative embodiment, the alert generator 128 may generate a notification in one or more formats, such as an email notification, a pop up notification, a voicemail message notification, a text message notification, an instant message notification, other types of notification, or any combination thereof.

Figure 2:
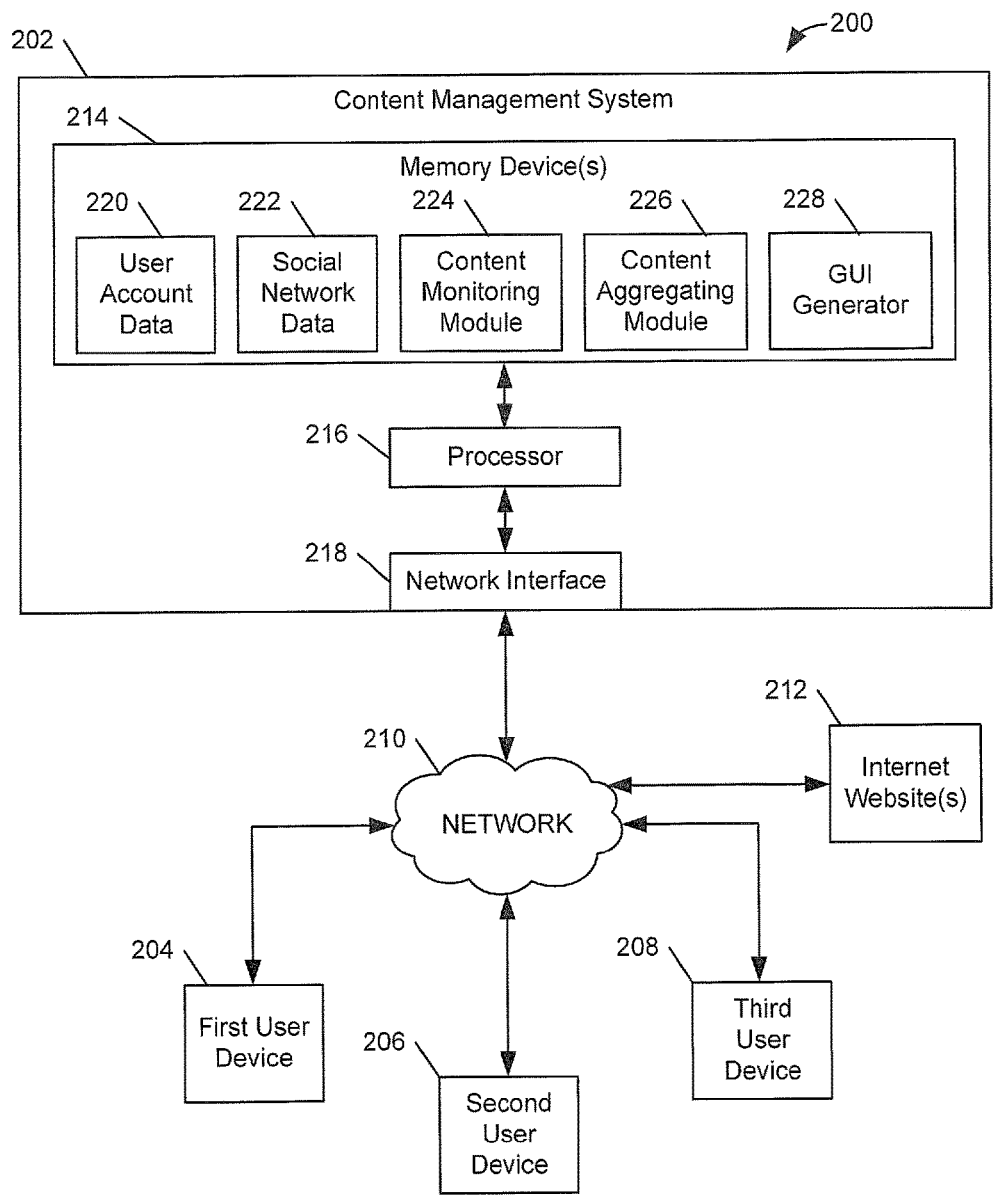
FIG. 2 is block diagram of a second particular illustrative embodiment of a system to present media content.

FIG. 2 is block diagram of a second particular illustrative embodiment of a system 200 to present media content. The system 200 includes a content management system 202 that can communicate with a first user device 204, a second user device 206 and a third user device 208 via a network 210, such as the public Internet. Additionally, the content management system 202 may communicate with other websites 212 via the network 210. The content management system 202 includes a processor 216 and a memory 214 that is accessible to the processor 216. Additionally, the content management system 202 includes a network interface 218 that is responsive to the network 210.

The memory 214 may include a user account data storage 220, a social network data storage 222, a content monitoring module 224, a content aggregating module 226, and a graphical user interface (GUI) generator module 228. The content monitoring module 224 can be executed by the processor 216 to monitor media content at specified locations to identify new media content. The content aggregating module 226 can be executed by the processor 216 to aggregate the identified new media content with media content associated with a user account of the first user. The GUI generator 228 can be executed by the processor 216 to generate a graphical user interface including multiple image cells. Each cell may include data related to particular media content.

In a particular illustrative embodiment, a first user, a second user and a third user may have respective user accounts hosted by the content management system 202. The first user may utilize the first user device 204 to access an associated user account at the content management system 202 via the network 210. In a particular illustrative embodiment, the content management system 202 may utilize the GUI generator 228 to produce a graphical user interface to receive information related to sharing of media content associated with the first user and information related to retrieval of media content related to other users. The first user may configure the associated user account information via the graphical user interface to add the second user and the third user to a social network of the first user.

The content management system 202 may receive the user input and store the social network information in the social network data storage 222, which is associated with the user account data 220 of the first user account. The content management system 202 may monitor media content associated with the second and third users to identify new media content. Additionally, the content management system 202 may aggregate the new media content with existing media content based on the user account information and the social network information. In a particular illustrative embodiment, the processor 216 may execute the GUI generator module 228 to produce a graphical user interface that includes multiple image cells, where each cell includes media content associated with the first user, the second user, and the third user. The content management system 202 may utilize the content aggregating module 226 to generate a document (such as a Really Simple Syndication (RSS) document) or an alert to other subscribers, such as the second user and the third user, to notify the second and third users of the new media content.

In a particular illustrative embodiment, the content management system 202 may monitor and access media content of the second user at a third-party website, such as one of the websites 212, via the network 210. In another particular illustrative embodiment, the content management system 202 may aggregate media content from one or more websites 212 via the network 210. In still another particular embodiment, the content management system 202 may monitor multiple social networks for the first user. Additionally, the content management system 202 may monitor one or more social networks for other users, such as the second and third users.

Figure 3:
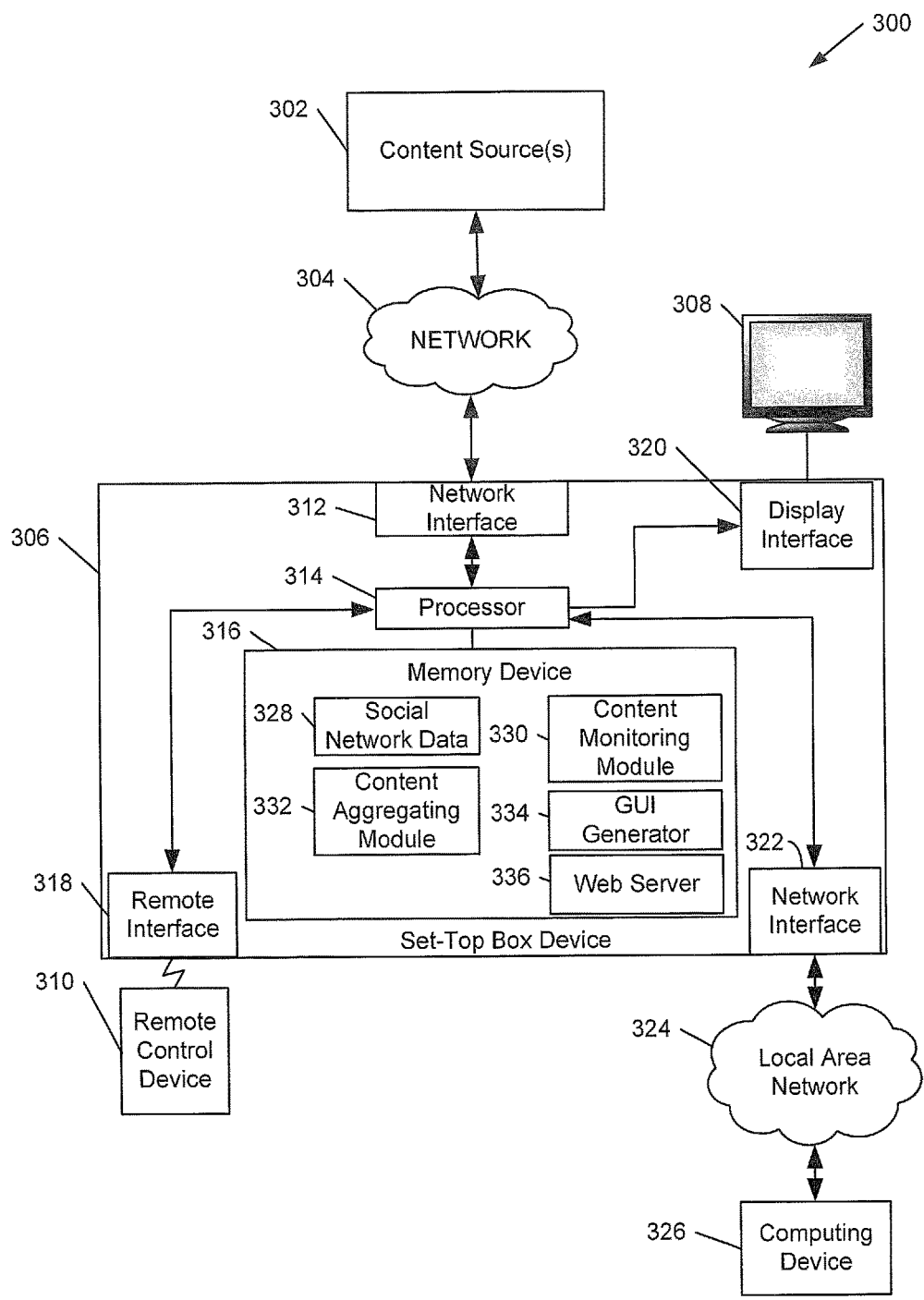
FIG. 3 is a block diagram of a third particular illustrative embodiment of a system to present media content.

FIG. 3 is a block diagram of a third particular illustrative embodiment of a system 300 to present media content. The system 300 includes a set-top box device 306 that can communicate with one or more content sources 302 via a network 304. The set-top box device 306 may communicate with a remote control device 310 to receive input. Additionally, the set-top box device 306 may provide media content to a display device 308. Further, the set-top box device 306 may communicate with one or more computing devices, such as the computing device 326 via a local area network 324.

The set-top box device 306 includes a network interface 312 that is responsive to the network 304 to send and receive data. The set-top box device 306 also includes a processor 314 and a memory 316 that is accessible to the processor 314. Additionally, the set-top box device 306 includes a remote interface 318 that is responsive to the remote control device 310 and a display interface 320 that communicates audio and video to the display device 308, such as a television. The set-top box device 306 also includes a network interface 322 that is responsive to the local area network 324. In a particular illustrative embodiment, the network interface 322 may include a wireless transceiver to send and receive data to and from the computing device 326.

The memory 316 includes social network data 328 including one or more identifiers of one or more other users framing a social network associated with a user account, where each identifier within the social network is associated a website accessible to a particular user. The memory 316 also includes a content monitoring module 330 executable by the processor 314 to monitor media content at the media content locations, identified within the social network data 328, to identify new media content. The memory 316 further includes a content aggregating module 332 executable by the processor 314 to collect data related to the media content from a selected third party website and to aggregate the collected data with existing data within multiple image cells. The memory 316 also includes a GUI generator module 334 that is executable by the processor 314 to generate a graphical user interface including the multiple image cells.

In a particular illustrative embodiment, the multiple image cells may include multiple selectable cells arranged according to a preference of a first user. A first cell of the multiple image cells may include an image related to media content from the first user. The multiple image cells may also include a selectable cell having an image that is related to media content of a user other than the first user. In a particular illustrative embodiment, an input indicating a selection of the selectable cell causes the set-top box device 306 to generate a display window that includes the media content associated with the source. In a particular illustrative non-limiting embodiment, an input indicating a selection may be provided by right-clicking on a cell of the multiple selectable cells, causing the set-top box device 306 to generate a second display window to display a configuration menu.

In a particular illustrative embodiment, the set-top box device 306 may monitor the media content from one or more sources using the content monitoring module 330 to identify updated or new media content, may collect data related to the media content, and may aggregate the data within the multiple image cells using the content aggregating module 332. Additionally, the set-top box device 306 may generate a graphical user interface using the GUI generator 334. In a particular illustrative embodiment, the set-top box device 306 may provide an alert to the display device 308 via the display interface 320, such as a pop up, a selectable indicator, or any combination thereof, to notify a viewer that media content is available from a member of the user's social network. The set-top box device 306 may receive an input related to the alert via the remote control device 310 and may display multiple image cells on the display device 308 in response to receiving the input. In another particular illustrative embodiment, the set-top box device 306 may provide the graphical user interface to the computing device 326 via the local area network 324. The computing device 326 may be a portable computer, a desktop computer, a personal digital assistant (PDA), a wireless phone, or any combination thereof.

Figure 4:
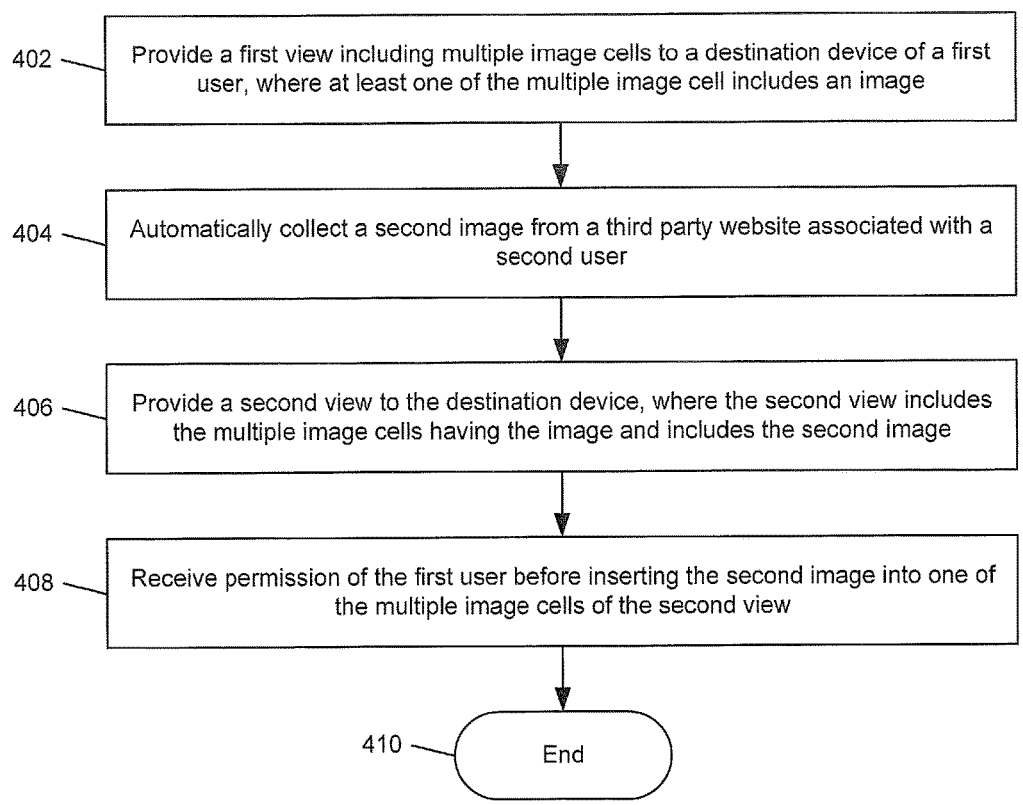
FIG. 4 is a flow chart of a particular illustrative embodiment of a method of presenting media content.

FIG. 4 is a flow chart of a particular illustrative embodiment of a method of presenting media content. At 402, a content management system provides a first view including multiple image cells to a destination device of a first user, where at least one cell of the multiple image cells includes an image. In a particular illustrative embodiment, the content management system may be a webserver, a content source, or any combination thereof. Moving to 404, the content management system automatically collects a second image from a third party website associated with a second user. Advancing to 406, the content management system provides a second view to the destination device, where the second view includes the multiple image cells having the image and includes the second image. Proceeding to 408, the content management system receives permission of the first user before inserting the second image into one of the multiple image cells of the second view. The method terminates at 410.

In a particular illustrative embodiment, the content management system may be implemented such that it does not wait for permission of the first user before inserting the second image into one of the multiple image cells. In that instance, the method at 408 may be replaced such that the second image may be inserted into one of the multiple image cells automatically upon collection. In another particular illustrative embodiment, the multiple image cells are arranged in date order. In still another particular embodiment, the multiple image cells may be arranged in a matrix or table having rows and columns of image cells, where each row is associated with a web site location. In still another particular illustrative embodiment, the method may also include automatically collecting a third image from a website associated with a third user and providing a third view to the destination device, where the third view includes the multiple image cells having the image, the second image, and the third image.

Figure 5:
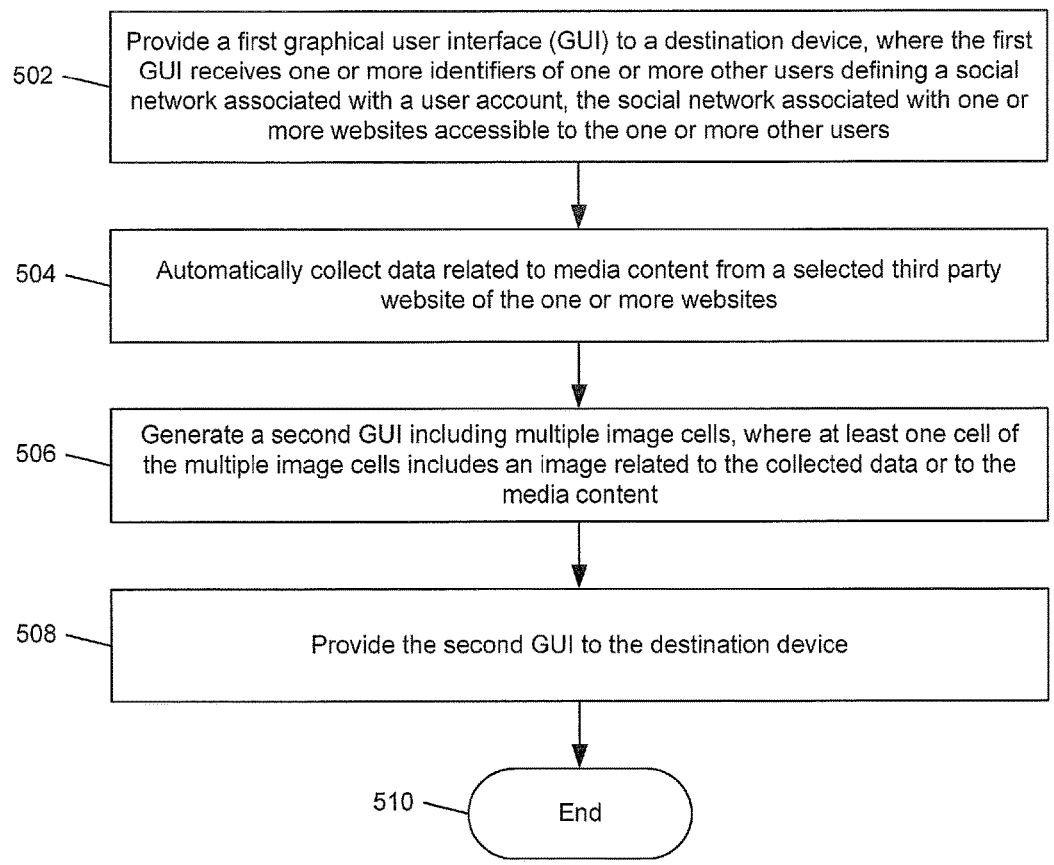
FIG. 5 is a flow chart of a second particular illustrative embodiment of a method of presenting media content.

FIG. 5 is a flow chart of a second particular illustrative embodiment of a method of presenting media content. At 502, a content management system (such as a webserver, a content source, or any combination thereof) provides a first graphical user interface (GUI) to a destination device, where the first GUI receives one or more identifiers of one or more other users defining a social network associated with a user account. Each of the identifiers within the social network may be associated with one or more websites accessible to the one or more other users. Proceeding to 504, the content management system automatically collects data related to media content from a selected third party website. Advancing to 506, the content management system generates a second GUI including multiple image cells, where at least one cell of the multiple image cells includes an image related to the collected data or to the media content. Moving to 508, the content management system provides the second GUI to the destination device. The method terminates at 510.

In a particular illustrative embodiment, the data may be an image that is associated with a link to a particular uniform resource locator (URL), which may point to an audio file, a video file, a multimedia stream, a digital image, text, or any combination thereof. In a particular illustrative embodiment, the social network includes a first user associated with the destination device and a second user associated with at least one of the one or more websites. In a particular illustrative, non-limiting example, the multiple image cells are arranged in date order, in a user-specified order, in alphabetical order, in another order, or any combination thereof.

Figure 6:
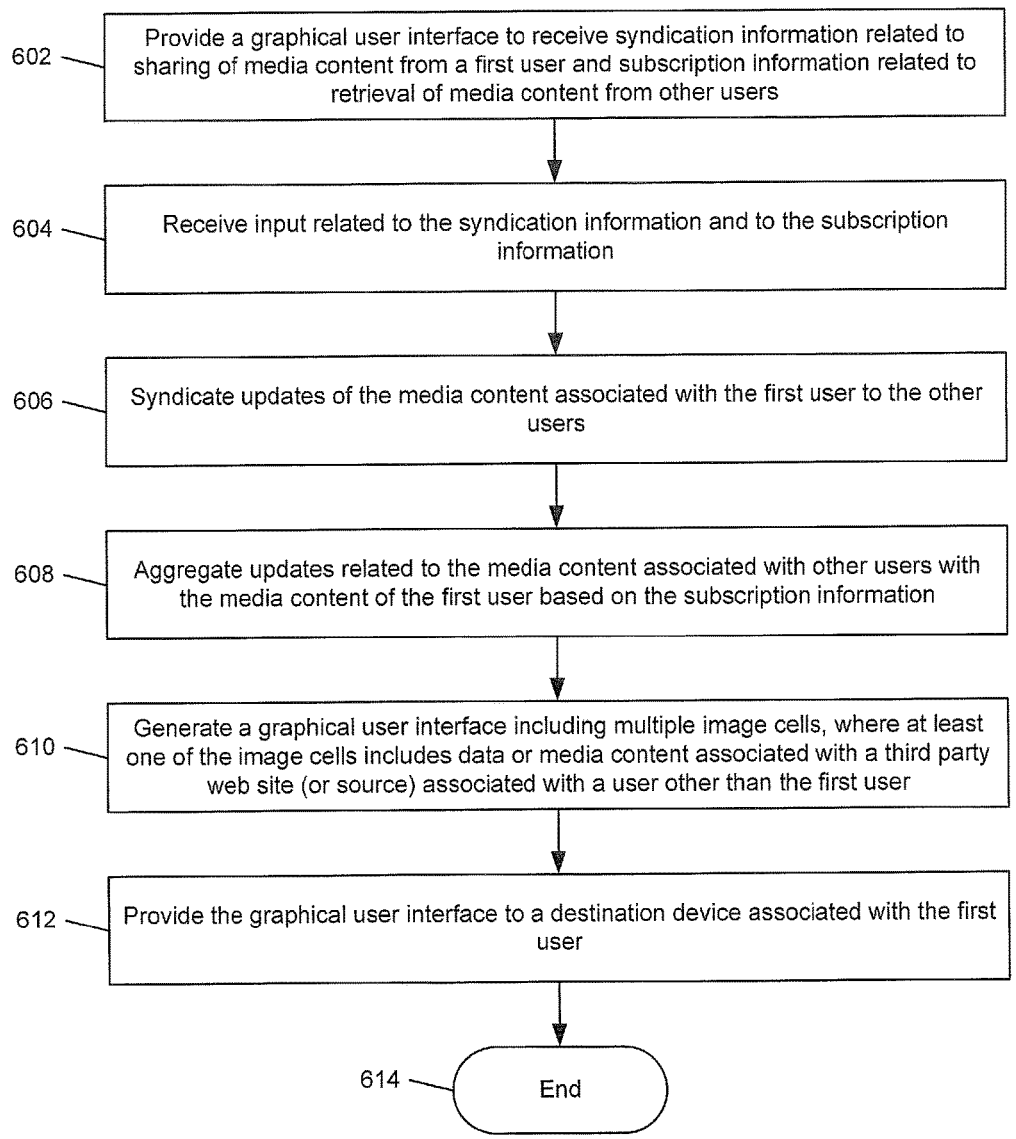
FIG. 6 is a flow diagram of a third particular illustrative embodiment of a method of presenting media content.

FIG. 6 is a flow chart of a third particular illustrative embodiment of a method of presenting media content. At 602, a content management system provides a graphical user interface to a destination device, where the graphical user interface includes input options to receive syndication information related to sharing of media content from a first user and subscription information related to retrieval of media content from a source other than the first user. In a particular illustrative embodiment, the content management system may be a web server, a content source, a set-top box device, or any combination thereof. Advancing to 604, the content management system receives an input related to the syndication information and to the subscription information. Proceeding to 606, the content management system syndicates updates of the media content associated with the first user to the other users. In a particular illustrative embodiment, the content management system "syndicates" by generating a document that includes the updated information. The generated document may be sent to subscriber devices or may be posted at a website location for retrieval by or on behalf of other users. Continuing to 608, the content management system aggregates updates related to the media content associated with the other users with the media content of the first user based on the subscription information. In a particular illustrative embodiment, the content management system may collect an image from a third party website associated with another user, who may be a member of a social network associated with the first user. Proceeding to 610, the content management system generates a graphical user interface including multiple image cells, where at least one of the image cells includes data or media content from a third party website (or a source) associated with a user other than the first user. Advancing to 612, the content management system provides the graphical user interface to a destination device that is associated with the first user. The method terminates at 614.

In a particular illustrative embodiment, each image cell may include a selectable indicator, such as an icon, an image, other data, or any combination thereof, that is related to the media content. In another particular illustrative embodiment, the graphical user interface may include a menu to configure selected cells. In still another particular illustrative embodiment, a user account may include an association with a social network, which may be formed from one or more identifiers that are associated with one or more other users, where each identifier within the social network is associated with one or more websites accessible to the one or more other users. In a particular embodiment, each user may create multiple social networks, and each user account may be associated with any number of social networks. In an embodiment, the media content may include an image, video data, audio data, text data, or any combination thereof. In a particular illustrative embodiment, the data within a particular image cell may represent the particular type of media content. For example, a digital photograph may be represented by a thumbnail (reduced size) version of the digital photograph. Alternatively, the audio data may be represented by an audio icon, such as an audio speaker, an ear, a word bubble, another visual indicator, or any combination thereof. In another particular illustrative example, the video data may be represented by an icon (such as an image of a video camera, a television set, another indicator, or any combination thereof), by a frame selected from the video, by another object, or any combination thereof.

In a particular illustrative embodiment, the content management system may aggregate the updates by collecting an image or associated data from a selected third party website. The content management system may insert the collected image into a selected image cell of a graphical user interface that includes multiple image cells. The image may be inserted into the multiple image cells by shifting existing image content within the multiple image cells to make room for the update image and by inserting the update image into an open cell. In a particular illustrative embodiment, the multiple image cells may be arranged to form a matrix or table having multiple cells, and the content management system may shift data from left to right and from top to bottom within the multiple image cells. For example, in a particular illustrative example, a 4×4 matrix of image cells may include 16 images associated with particular media content. When media content is added, the contents of the matrix of image cells may be shifted from left to right and from top to bottom to provide an empty cell in an upper left corner for insertion of the media content. During such a shift operation, the contents of a last cell in a lower right corner of the multiple image cells may be pushed out. In a particular illustrative example, the contents of the last cell may be shifted to an image archive. In general, the above-examples are intended for illustrative purposes only. In particular embodiments, the images may be shifted and added in other arrangements.

Figure 7:
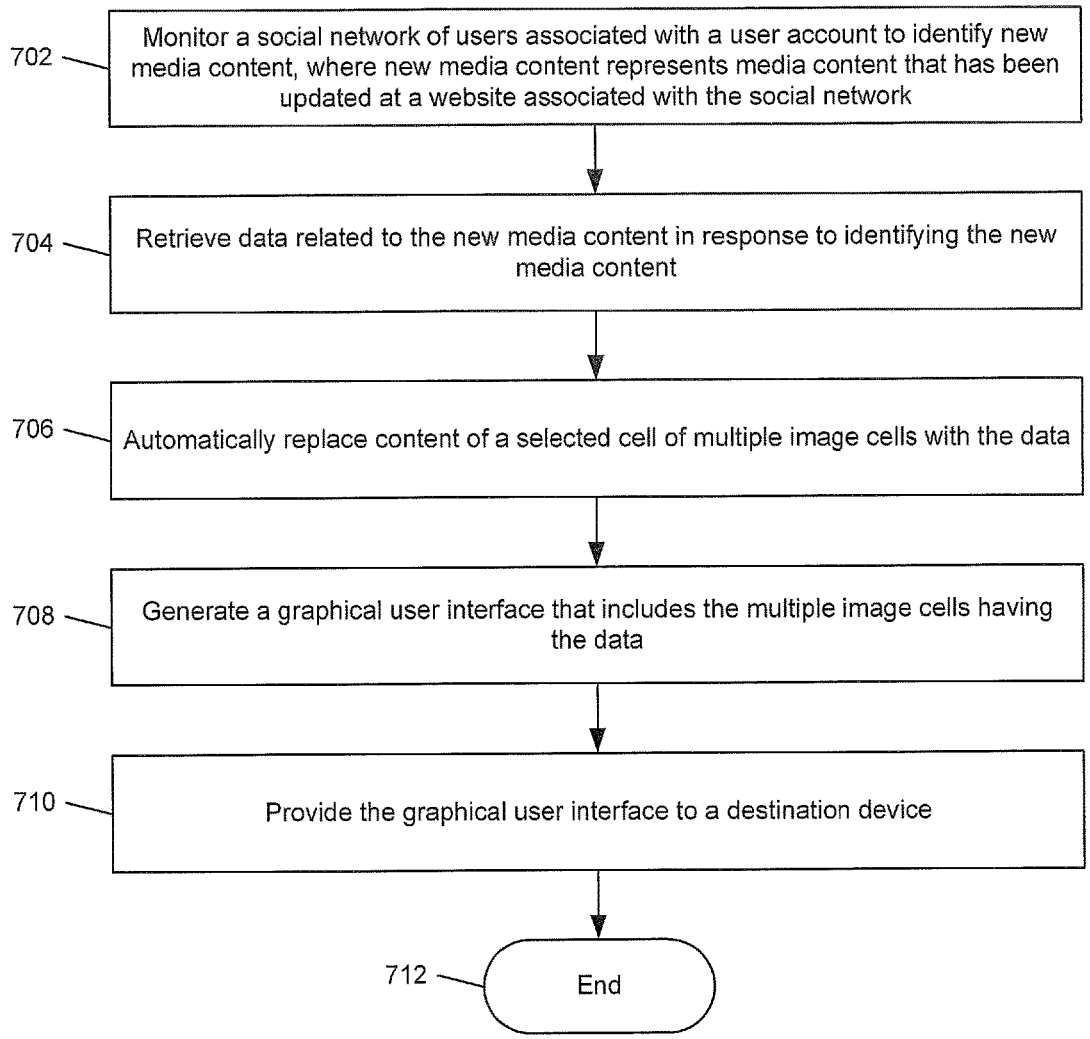
FIG. 7 is a flow diagram of a fourth particular illustrative embodiment of a method of presenting media content.

FIG. 7 is a flow chart of a fourth particular illustrative embodiment of a method of presenting media content. At 702, a content management system (such as a set-top box device, a web server, a network system, another device, or any combination thereof) can monitor a social network of users associated with a user account to identify new media content, where new media content represents media content that has been updated at a website associated with the social network. Advancing to 704, the content management system retrieves data related to the new media content in response to identifying the new media content. Proceeding to 706, the content management system automatically replaces content of a selected image cell of multiple image cells with the data. Moving to 708, the content management system generates a graphical user interface that includes the multiple image cells having the data. Continuing to 710, the content management system provides the graphical user interface to a destination device. The method terminates at 712.

In a particular illustrative embodiment, the destination device may be a remotely located computing device, a local computing device, a television display, a storage device, or any combination thereof. In another particular illustrative embodiment, the data comprises an image related to the new media content. In still another particular illustrative embodiment, the content management system may receive an input related to a selected cell of the multiple cells and may provide a menu to configure the selected cell in response to receiving the input. In a particular illustrative embodiment, the input is a selection to freeze content associated with the selected cell to prohibit automatic replacement. In a particular embodiment, "freezing" the content of a cell may lock the cell content, such that shifting of image content with the multiple image cells may occur with respect to adjacent cells, but without changing the content of the particular cell. In a particular illustrative embodiment, automatically replacing a selected item may include determining a cell of the multiple cells that has an oldest modification date, moving the content from the cell to a data archive, and adding the data to the cell.

In yet another particular illustrative embodiment, the content management system may insert a selectable indicator within a video stream at a display device (such as a television, a liquid crystal display, a monitor, another display device, or any combination thereof), where the selectable indicator relates to the identification of the updated media content from a source other than a user of the content management system. In response to receiving an input related to the selectable indicator, the content management system can provide a graphical user interface including multiple image cells having the updated media content to the display device.

Figure 8:
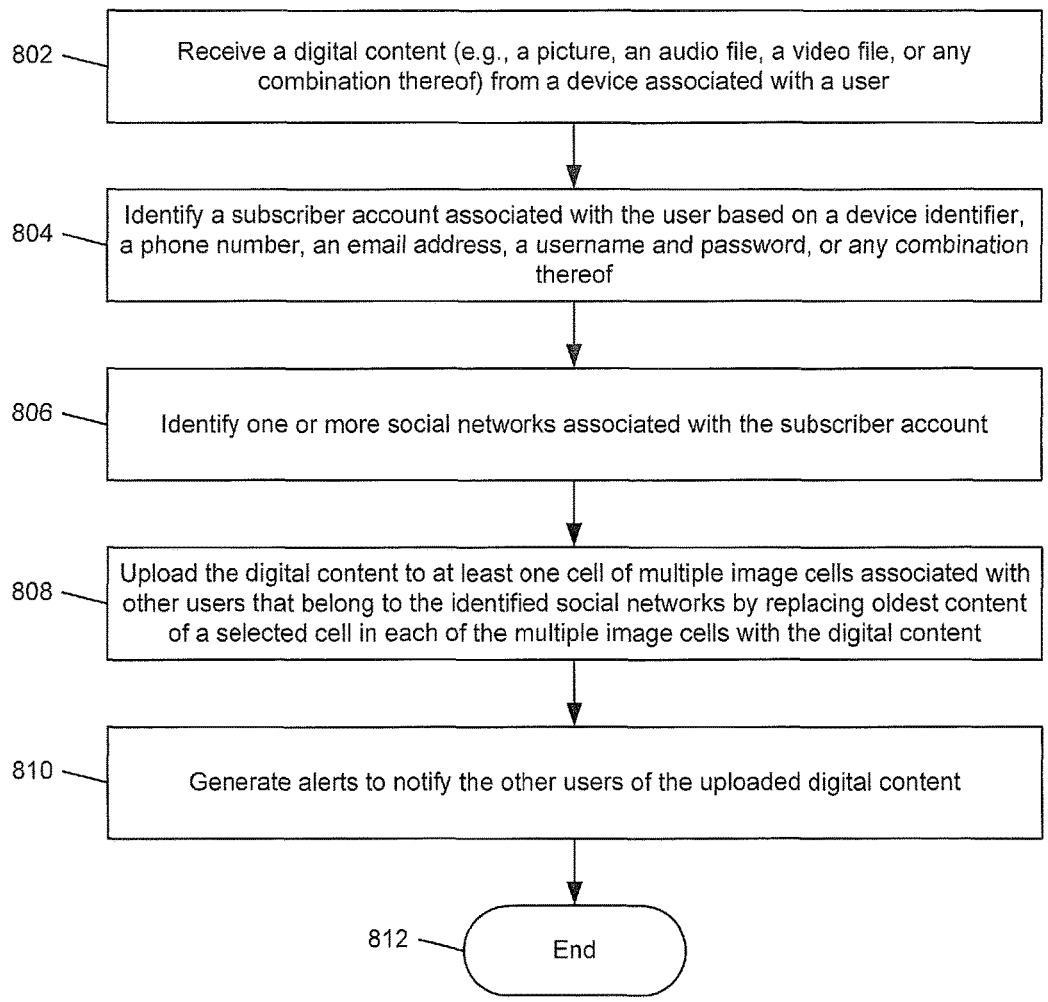
FIG. 8 is a flow diagram of a fifth particular illustrative embodiment of a method of presenting media content.

FIG. 8 is a flow diagram of a fifth particular illustrative embodiment of a method of presenting media content. At 802, a content management system receives digital content (e.g., a picture, an audio file, a video file, text, or any combination thereof) from a device associated with a user. Proceeding to 804, the content management system 804 identifies a subscriber account associated with the user based on a device identifier, a phone number, an email address, a username and password, or any combination thereof. Moving to 806, the content management system identifies one or more social networks associated with the subscriber account. Advancing to 808, the content management system uploads the digital content to at least one cell of multiple image cells associated with other users that belong to the identified social networks by replacing oldest content of a selected cell in each of the multiple image cells with the digital content. In a particular illustrative embodiment, the content management system may generate an update document (such as Really Simple Syndication (RSS) document). The document may be published to a pre-defined Internet location or may be sent to subscribers to notify subscribers of the updated media content. Continuing to 810, the content management system generates alerts to notify the other users of the uploaded digital content. The method terminates at 812.

Figure 9:
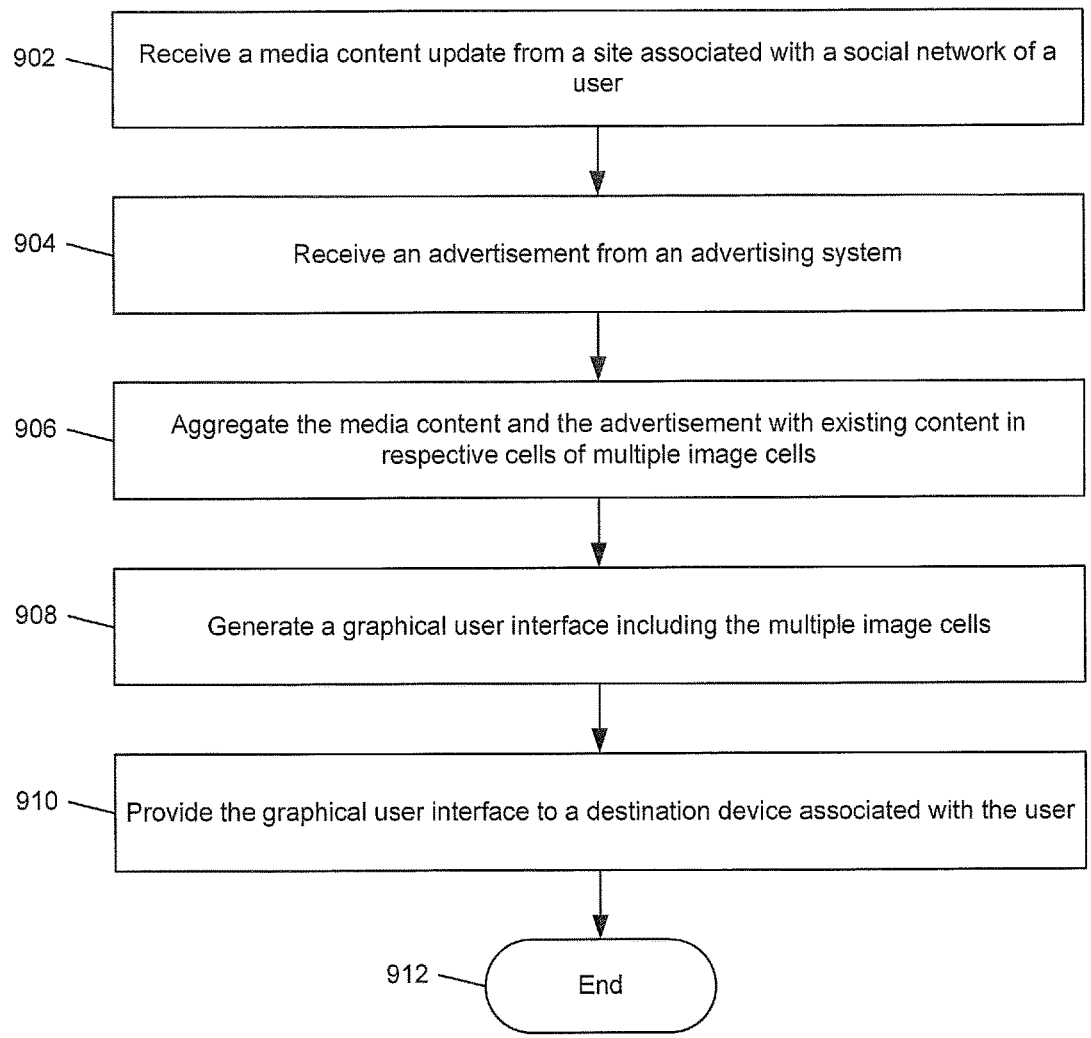
FIG. 9 is a flow diagram of a sixth particular illustrative embodiment of a method of presenting media content.

FIG. 9 is a flow diagram of a sixth particular illustrative embodiment of a method of presenting media content. At 902, the content management system receives a media content update from a site associated with a social network of a user. Proceeding to 904, the content management system receives an advertisement from an advertising system. Advancing to 906, the content management system aggregates the media content and the advertisement with existing content in respective cells of multiple image cells. Moving to 908, the content management system generates a graphical user interface including the multiple image cells. Continuing to 910, the content management system provides the graphical user interface to a destination device associated with the user. The method terminates at 912.

In a particular illustrative embodiment, the advertisement may include an image that is selectable to direct the user to a website of a particular product or service. The image may be placed within the multiple image cells such that the picture is not distinguishable from the existing media content. In a particular illustrative embodiment, the advertisement may be selected as a targeted advertisement based on information about the user, based on user preferences, based on other characteristics of the user, or any combination thereof. In a particular illustrative embodiment, the advertisement may be displayed within the multiple image cells as an overlay to an existing indicator. For example, in a particular illustrative, non-limiting embodiment, an advertising picture may overlay a particular cell of the multiple image cells within the graphical user interface, such that the advertisement prevents viewing of the underlying image until the user selects the advertisement.

Figure 10:
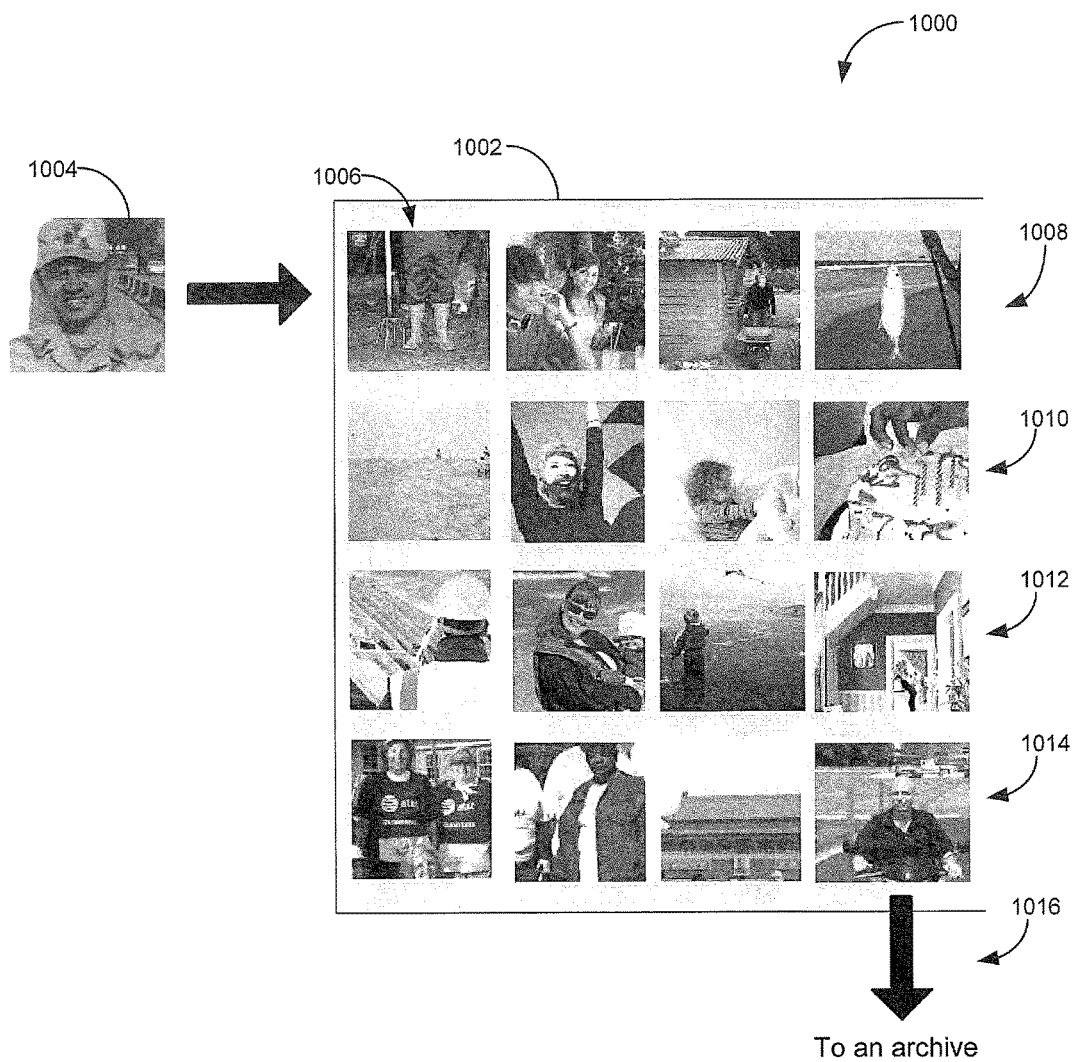
FIG. 10 is a flow diagram of a seventh particular illustrative embodiment of a method of presenting media content.

FIG. 10 is a flow diagram 1000 of a seventh particular illustrative embodiment of a method of presenting media content. The flow diagram 1000 includes multiple image cells 1002, such as a first cell 1006. When new media content is identified, the content management system may receive data, such as a thumbnail image 1004, that is related to the new media content. The content management system may shift media content in a first row 1008 from left to right to open up the first cell 1006 for insertion of the thumbnail image 1004. Media content from a last cell of the first row 1008 may be shifted into a first cell of a second row 1010, and from the last cells of the second and third rows 1010 and 1012 to the first cells of the third and fourth rows 1012 and 1014, respectively. Media content of the last cell of the fourth row 1014 may be shifted out of the multiple image cells 1002 to an archive, as indicated at 1016.

In a particular illustrative embodiment, data may be organized within the multiple image cells 1002 in a date order, such that the newest item is included in the first cell 1006 and such that the last cell of the fourth row 1014 of the multiple image cells 1002 includes the oldest data. In this context, the date associated with particular content of a cell may be a date when the content was added to a particular cell of the multiple image cells. In an alternative embodiment, each row 1008, 1010, 1012, and 1014 may be assigned to a different content source (i.e. a different network address). In this example, each row may contain images that are related to a particular member of the user's social network. For example, the first row 1008 may be assigned to a location associated with the user's friend, Jim, and the second row 1010 may be assigned to a location associated with the user's sister, Mary. In this example, the new thumbnail image 1004 is inserted in a first row, since the first row is assigned to a user associated with the image 1004. Additionally, when the media content is shifted from left to right, media content from the last cell of the first row 1008 may be removed from the multiple image cells and stored in an archive. The other image content of the second row 1010, the third row 1012, and the fourth row 1014 would remain unchanged.

Figure 11:
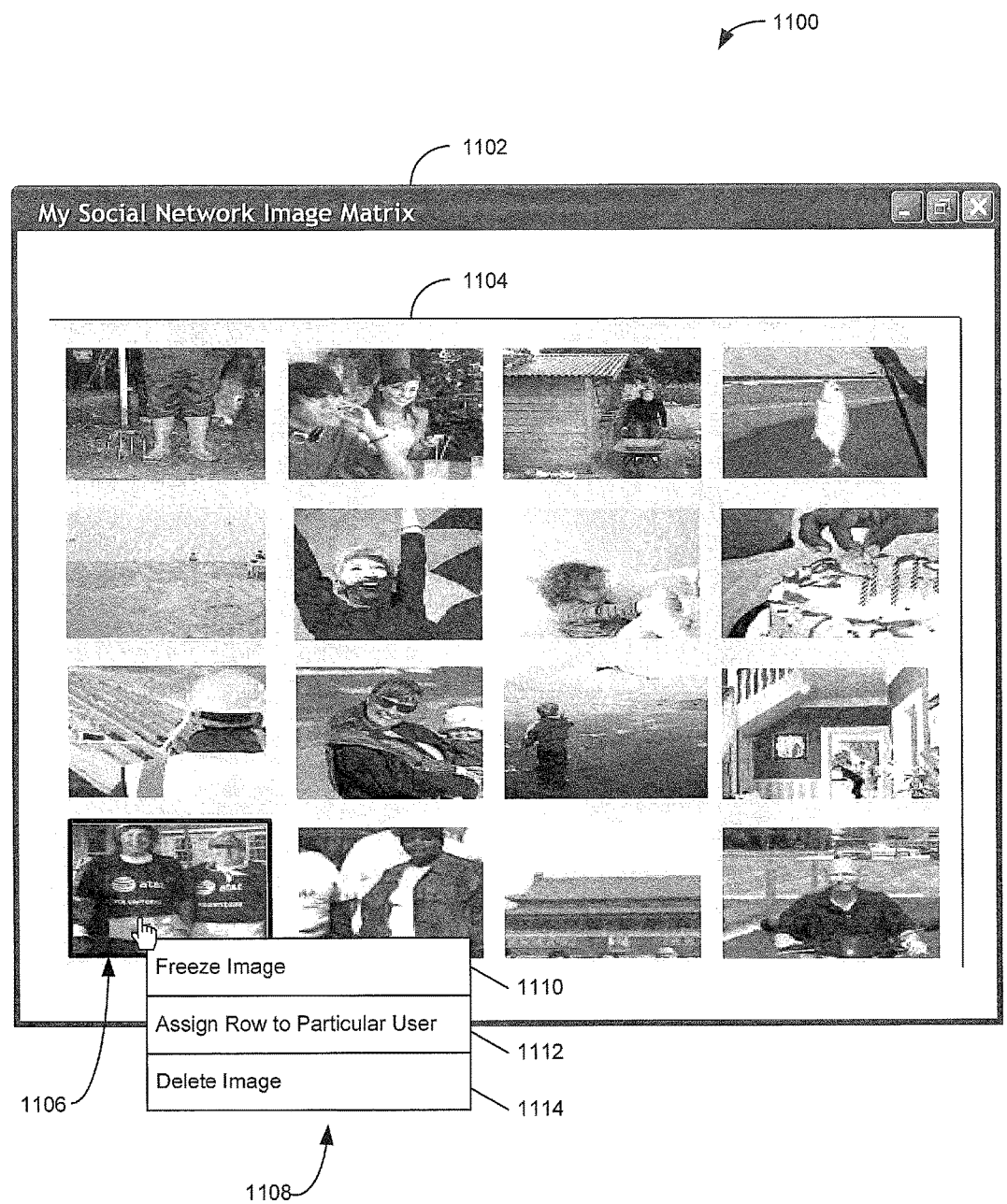
FIG. 11 is a block diagram of a particular illustrative embodiment a graphical user interface to present media content.

FIG. 11 is a block diagram of a particular illustrative embodiment a graphical user interface 1100 for presenting media content, which may be accessed via a web browser executed on a device of the user. The graphical user interface includes a window 1102 including multiple selectable image cells 1104 arranged according to a preference of a first user. Each selectable cell of the multiple selectable image cells 1104 includes an image related to media content from the first user or from a source other than the first user. A first selection of a selectable cell, such as the cell 1106, causes a first display window to display the media content associated with the source. A second selection of the selectable cell 1106 causes a configuration menu 1108 to be displayed.

The configuration menu 1108 provides access to a display window to configure the multiple image cells 1104. The menu 1108 includes a "Freeze Image" option 1110 to freeze the particular image so that media content updates do not shift, replace or remove the contents of the selected cell 1106. The menu 1108 also includes an "Assign Row to Particular User" option 1112 that allows the user to configure the multiple image cells 1102 such that each row relates to a particular content source (e.g., a particular member of the user's social network, a particular network location, a particular website, or any combination thereof). Additionally, the menu 1108 includes a "Delete Image" option 1114 to allow the user to delete the selected image from the multiple selectable image cells 1104.

In a particular illustrative embodiment, the menu 1108 may be accessed by right clicking on the selected image 1106 using a pointer device (such as a computer mouse, a track pad, a track ball, or other another pointer) or by holding down a keyboard key (such as a control key) while clicking on the selected image 1106 using the pointer device. In another particular illustrative embodiment, the menu 1108 may be accessed via buttons, links, pull down menu items, or any combination thereof within the window 1102.

In another particular illustrative embodiment, a user may configure the multiple selectable image cells 1104 such that each row contains images from a different set of multiple image cells associated with the user. In this example, each row of the set of multiple selectable image cells 1104 may be assigned to a location associated with another particular set of multiple selectable image cells, rather than to a location associated with a particular user. In a particular illustrative example, a first user may configure the system to aggregate images from multiple sources to three different sets of multiple selectable images (i.e. school friends, sports friends, and work friends, for example). The first user may configure the system to collect images from the three different sets of multiple selectable images to produce a fourth set of multiple selectable images (i.e. friends), which aggregates all of the pictures in a single set of multiple image cells. In a particular illustrative, non-limiting embodiment, the first user may configure the fourth set of multiple selectable images such that a first row is populated with images associated with "school friends," a second row is populated with images associated with "sports friends," and a third row is populated with images associated with "work friends."

Figure 12:
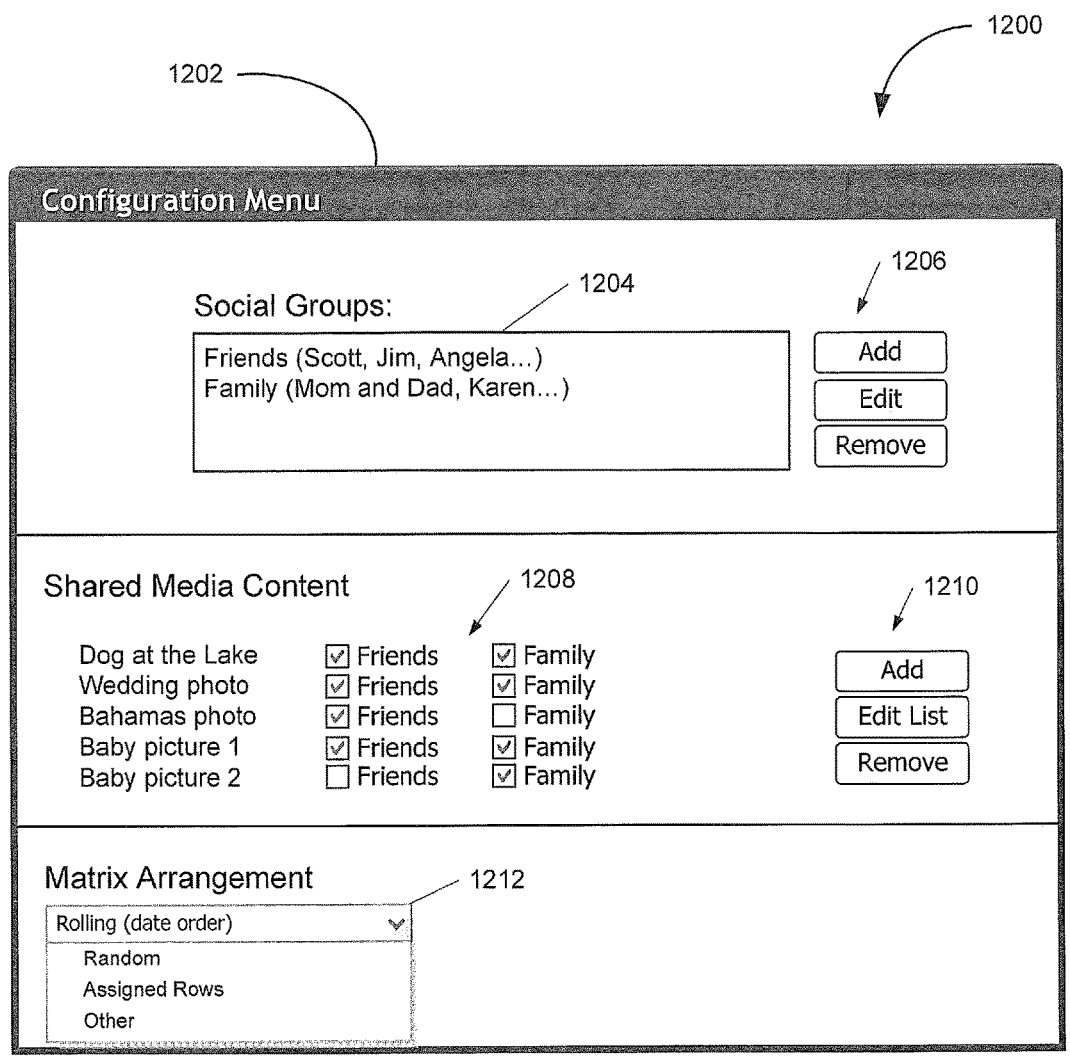
FIG. 12 is a block diagram of a second particular illustrative embodiment of a graphical user interface to present media content.

FIG. 12 is a block diagram of a second particular illustrative, non-limiting example of a graphical user interface (GUI) 1200 for presenting media content, which may be accessed via a web browser executed on a device of the user. The GUI 1200 includes a window 1202 that includes a list of social groups 1204 that have been defined by the user and a set of buttons (Add, Edit, and Remove) 1206 for editing the list. Additionally, the window 1202 includes a list of media content 1208, including selectable options indicating which particular items within the list are shared with the particular groups (i.e. friends or family). Additionally, the window 1202 includes a set of selectable buttons 1210 to allow a user to alter the list of media content, such as by adding images, video, audio, other media content, or any combination thereof, by editing the list, or removing items from the list. Additionally, the window 1202 includes a pull down menu 1212 to allow the user to configure the organization of the multiple selectable cells.

In a particular illustrative embodiment, the user may select a rolling (date order), where new media content is added, and existing media content is shifted left to right and top down until the oldest item is pushed out of the multiple selectable cells. Alternatively, the media content may be assembled within the multiple selectable cells in a random order. In another embodiment, the media content may be assembled in rows based on the source of the media content, allowing the user to configure each row to receive media content from a source that is associated with a particular member of the social network (e.g., assigned rows). Other arrangements, such as a user-specified arrangement, may also be used.

Figure 13:
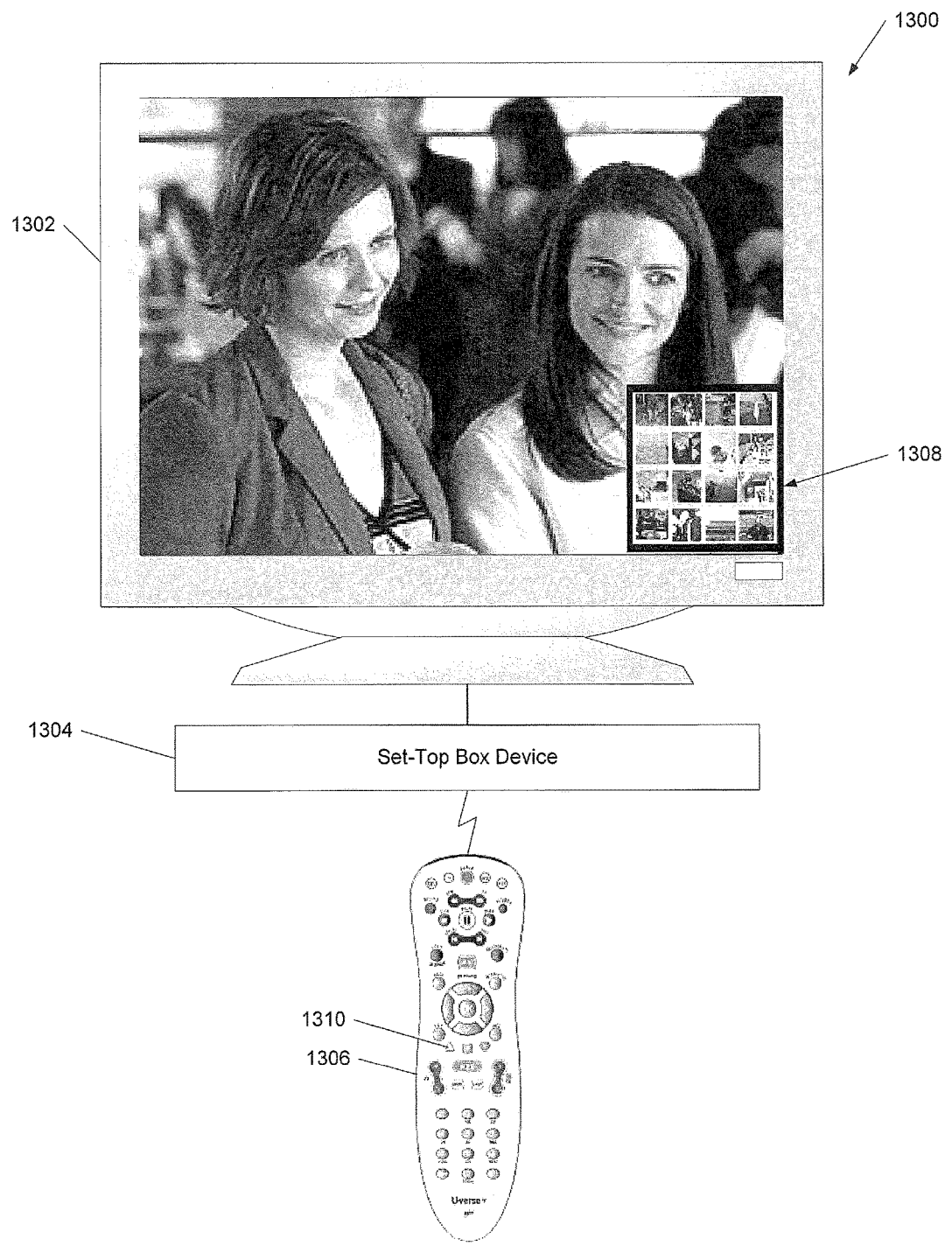
FIG. 13 is a block diagram of a system to provide an alert notification related to presented media content.

FIG. 13 is a block diagram of a particular illustrative embodiment of a system 1300 to present media content. The system 1300 includes a remote control device 1306 that can communication with a set-top box device 1304 (which may be similar to the set-top box device 306 in FIG. 3) to control a display device 1302. The set-top box device 1304 may receive a notification of new media content and may provide a popup notification 1308 to indicate that new media content is available from a member of a social network associated with the user. The user may access the media content by interacting with the popup notification 1308 shown at the display device 1302, by selecting a key on the remote control device 1306, such as the key 1310.

In a particular illustrative embodiment, the set-top box device 1304 may collect data related to the media content from a source associated with a member of the user's social network, generate the popup notification 1308, and provide the popup notification 1308 to the display device 1302 within a video stream. In another particular embodiment, the notification may be received from a content management source via a network, such as the network 304 in FIG. 3, and may be provided to the display device 1302 by the set-top box device 1304.

In conjunction with the configuration of structure described herein, the system and method disclosed provide an interface to disseminate media content to members of a social network and to receive shared media content from members of the social network. A content management system, such as a web server, a set-top box device, or another device, may provide a first view including multiple image cells to a destination device of a first user, where at least one cell includes an image. The content management system may automatically collect a second image from a third party website associated with a second user and may provide a second view to the destination device. The second view includes the multiple image cells and includes the second image. In a particular illustrative embodiment, the content management system may provide a graphical user interface (GUI) to a destination device to receive an identifier of another user to form a social network associated with a user account of a first user, where each identifier within the social network is associated with one or more websites accessible to a user other than the first user. The content management system may automatically collect data related to the media content from a selected third party website based on a selected identifier. The content management system may generate a second GUI including multiple image cells, where at least one cell includes an image that is related to the collected data or to the media content. In an illustrative embodiment, the content management system may be a set-top box device or may provide a notification to a set-top box device, which may provide an indicator related to the multiple image cells to a display device, such as a television.

Figure 14:
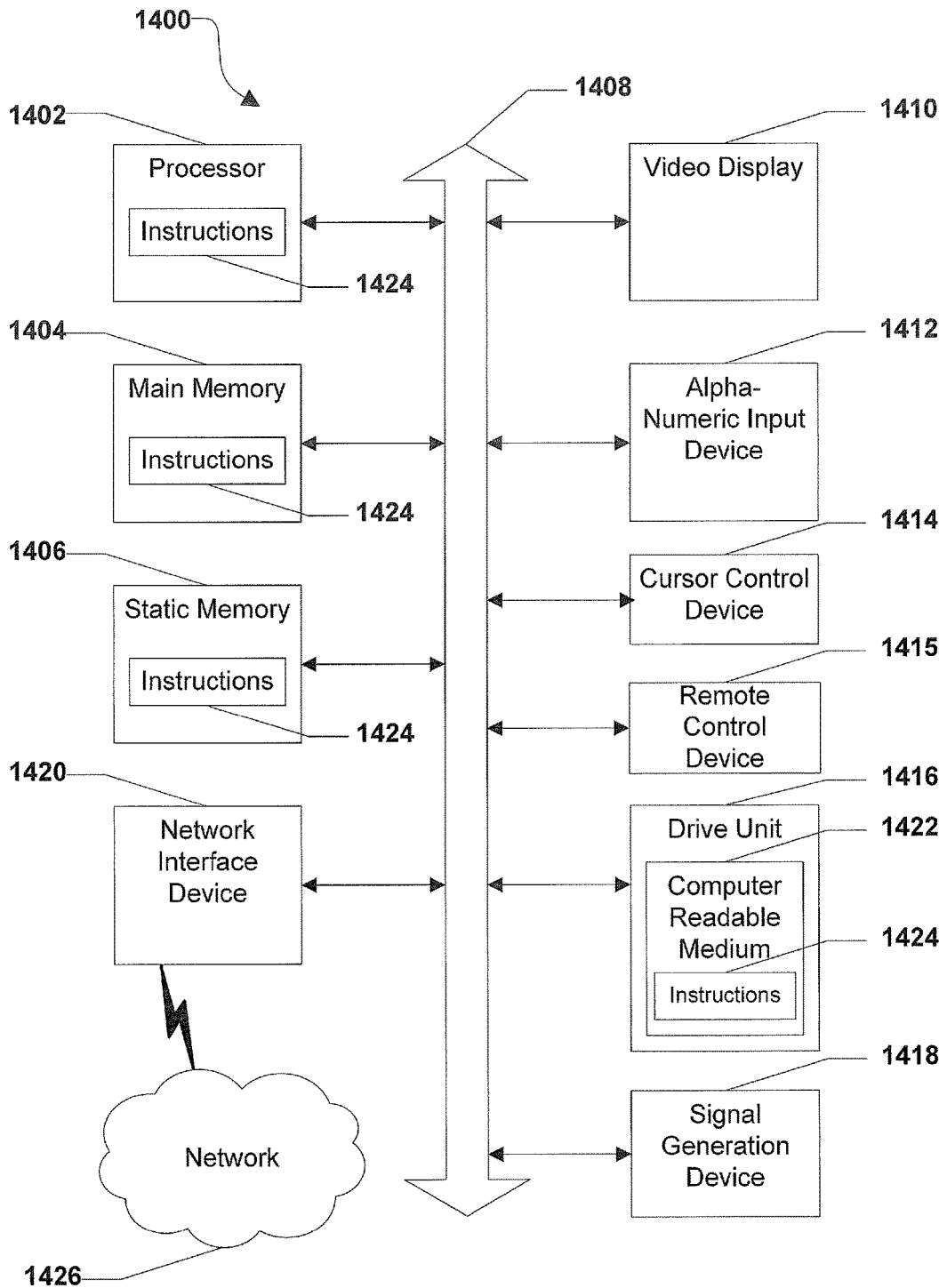
FIG. 14 is a block diagram of an illustrative embodiment of a computing system.

Referring to FIG. 14, an illustrative embodiment of a general computer system is shown and is designated 1400. The computer system 1400 can include a set of instructions that can be executed to cause the computer system 1400 to perform any one or more of the methods or computer based functions disclosed herein, such as monitoring media content associated with members of a social network to identify new media content and aggregating the new media content into a matrix, a table, or other arrangement of image cells within a graphical user interface. The computer system 1400 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 1400 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 1400 can be implemented using electronic devices that provide voice, video or data communication. Further, while a single computer system 1400 is illustrated, the term "system" shall also be taken to include any collection of systems or sub-systems that individually or jointly execute a set, or multiple sets, of instructions to perform one or more computer functions.

As illustrated in FIG. 14, the computer system 1400 may include a processor 1402, e.g., a central processing unit (CPU), a graphics processing unit (GPU), or both. Moreover, the computer system 1400 can include a main memory 1404 and a static memory 1406 that can communicate with each other via a bus 1408. As shown, the computer system 1400 may further include a video display unit 1410, such as a liquid crystal display (LCD), an organic light emitting diode (OLED), a flat panel display, a solid state display, or a cathode ray tube (CRT). Additionally, the computer system 1400 may include an input device 1412, such as a keyboard, and a cursor control device 1414, such as a mouse. The computer system 1400 can also include a disk drive unit 1416, a signal generation device 1418, such as a speaker or remote control, and a network interface device 1420.

In a particular embodiment, as depicted in FIG. 14, the disk drive unit 1416 may include a computer-readable medium 1422 in which one or more sets of instructions 1424, e.g. software, can be embedded. Further, the instructions 1424 may embody one or more of the methods or logic as described herein. In a particular embodiment, the instructions 1424 may reside completely, or at least partially, within the main memory 1404, the static memory 1406, and/or within the processor 1402 during execution by the computer system 1400. The main memory 1404 and the processor 1402 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 1424 or receives and executes instructions 1424 responsive to a propagated signal, so that a device connected to a network 1426 can communicate voice, video or data over the network 1426. Further, the instructions 1424 may be transmitted or received over the network 1426 via the network interface device 1420.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the disclosed embodiments are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

The invention claimed is:

1. A method comprising:
   determining, by one or more servers, that a first user of the social network is to receive media content associated with a second user of the social network;
   receiving, by the one or more servers, media content associated with the second user;
   displaying the received media content associated with the second user as part of a grid of media content;
   identifying a targeted advertisement for presentation to the first user of the social network based on information about the first user stored in the social network;
   aggregating the targeted advertisement and the received media content into a modified grid of media content by inserting the targeted advertisement into a cell of the grid of media content and shifting the received media content within the grid of media content; and
   displaying the modified grid of media content.

2. The method as recited in claim 1, wherein determining that the first user is to receive media content associated with the second user comprises identifying that the first user and the second user are connected on the social network.

3. The method as recited in claim 2, wherein receiving, by the one or more servers, media content associated with the second user comprises receiving an upload of one or more of a digital photo or a video to the social network.

4. The method as recited in claim 1, further comprising sending, by the one or more servers, an alert to a device associated with the first user to inform the first user of the media content associated with the second user.

5. The method as recited in claim 4, wherein aggregating the targeted advertisement and the received the media content into the modified grid of media content comprises pushing the media content and the targeted advertisement to a mobile device associated with the first user.

6. The method as recited in claim 4, wherein the alert comprises a notification that includes one or more of a pop-up notification, a text message notification, or an instant message notification.

7. The method as recited in claim 4, wherein sending, by the one or more servers, the alert to the device associated with the first user to inform the first user of the media content associated with the second user comprises providing an alert associated with a website accessed by the device associated with the user.

8. The method as recited in claim 7, wherein aggregating the targeted advertisement and the received the media content into the modified grid of media content comprises overlaying the targeted advertisement over a portion of the received media content.

9. The method as recited in claim 1, wherein:
   receiving media content associated with the second user comprises receiving a photo; and
   displaying the received media content associated with the second user as part of the grid of media content comprises providing a thumbnail version of the photo in the grid of media content.

10. The method as recited in claim 1, wherein:
    receiving media content associated with the second user comprises receiving a video; and
    displaying the received media content associated with the second user as part of the grid of media content comprises providing a frame of the video selected by a user in the grid of media content.

11. The method as recited in claim 10, wherein displaying the received media content associated with the second user as part of the grid of media content comprises providing an icon associated with the frame of the video that causes the video to play within the grid of media content when selected.

12. A system comprising:
    at least one processor; and
    at least one non-transitory computer readable storage medium storing instructions thereon that, when executed by the at least one processor, cause the system to:
    determine that a first user of a social network is to receive media content associated with a second user of the social network;
    display the received media content associated with the second user as part of a grid of media content;
    identify a targeted advertisement for presentation to the first user of the social network based on information about the first user stored in the social network;
    aggregate the targeted advertisement and the received media content into a modified grid of media content by inserting the targeted advertisement into a cell of the grid of media content and shifting the received media content within the grid of media content; and
    display the modified grid of media content.

13. The system as recited in claim 12, wherein the instructions, when executed by the at least one processor, further cause the system to determine that the first user is to receive media content associated with the second user, thereby identifying that the first user and the second user are connected on the social network.

14. The system as recited in claim 13, wherein the instructions, when executed by the at least one processor, further cause the system to:
   detect that the second user has uploaded the media content to the social network; and
   send an alert to the device associated with the second user in response to the second user uploading the media content to the social network.

15. The system as recited in claim 14, wherein aggregating the targeted advertisement and the received media content into the modified grid of media content comprises displaying the received media content associated with the second user in a first cell of the grid of media content and the targeted advertisement in a second cell of the modified grid of media content.

16. The system as recited in claim 15, further comprising instructions that, when executed by the at least one processor, further cause the system to display the targeted advertisement overlaying a portion of media content in the second cell of the modified grid of media content.

17. The system as recited in claim 16, wherein the modified grid of media content comprises rows and columns of images cells.

18. A method comprising:
   determining, by at least one processor, that a first user of a social network is to receive media content associated with a second user of the social network;
   receiving, by the at least one processor, media content associated with the second user of the social network;
   displaying, by the at least one processor, the received media content associated with the second user as updates within a plurality of cells of a grid of media content;
   identifying a targeted advertisement for presentation to the first user of the social network based on information about the first user stored in the social network;
   aggregating the targeted advertisement and the received media content into a modified grid of media content by inserting the targeted advertisement into at least one cell of the plurality of cells of the grid of media content and shifting the received media content within the grid of media content; and
   displaying the modified grid of media content.

19. The method as recited in claim 18, wherein the targeted advertisement comprises a first digital photograph and the media content comprises a second digital photograph.

20. The method as recited in claim 19, wherein aggregating the targeted advertisement and the received media content into the modified grid of media content comprises inserting the first digital photograph and the second digital photograph into the modified grid of media content such that the a first cell including the targeted advertisement is not distinguishable from a second cell including the other media content in the modified grid of media content.

* * * * *